United States Patent
Cui et al.

(10) Patent No.: US 10,515,597 B2
(45) Date of Patent: Dec. 24, 2019

(54) DISPLAY DEVICE AND DRIVING METHOD

(71) Applicant: Shanghai Tianma Micro-Electronics Co., Ltd., Shanghai (CN)

(72) Inventors: Tingting Cui, Shanghai (CN); Kerui Xi, Shanghai (CN); Yumin Han, Shanghai (CN)

(73) Assignee: SHANGHAI TIANMA MICRO-ELECTRONICS CO., LTD., Shanghai (CN)

( * ) Notice: Subject to any disclaimer, the term of this patent is extended or adjusted under 35 U.S.C. 154(b) by 80 days.

(21) Appl. No.: 15/867,061

(22) Filed: Jan. 10, 2018

(65) Prior Publication Data
US 2018/0130432 A1    May 10, 2018

(30) Foreign Application Priority Data

Oct. 27, 2017  (CN) .......................... 2017 1 1019799

(51) Int. Cl.
*G09G 3/36*  (2006.01)
*G02F 1/1335*  (2006.01)

(52) U.S. Cl.
CPC ......... *G09G 3/36* (2013.01); *G02F 1/133528* (2013.01); *G02F 1/133602* (2013.01); *G09G 2310/0264* (2013.01)

(58) Field of Classification Search
CPC ........ G02F 1/133528; G02F 1/133602; G09G 3/36; G09G 3/3406; G09G 3/3648; G09G 2310/0264; G09G 2300/0452; G09G 2310/0235
See application file for complete search history.

(56) References Cited

U.S. PATENT DOCUMENTS

| | | | | |
|---|---|---|---|---|
| 9,804,317 B2* | 10/2017 | Kato | ..................... | G02B 6/0035 |
| 2005/0078240 A1* | 4/2005 | Murade | ............. | G02F 1/136209 349/110 |
| 2013/0063683 A1* | 3/2013 | Lin | ................... | G02F 1/133514 349/68 |
| 2015/0163387 A1* | 6/2015 | Lee | ........................ | H04N 5/238 349/2 |
| 2018/0350311 A1* | 12/2018 | Aoyama | ................. | G02F 1/133 |

FOREIGN PATENT DOCUMENTS

| CN | 105026995 A | 11/2015 |
|---|---|---|
| CN | 106019681 A | 10/2016 |

\* cited by examiner

*Primary Examiner* — Towfiq Elahi
(74) *Attorney, Agent, or Firm* — Anova Law Group PLLC (57) ABSTRACT

A display device and a driving method thereof are provided. The display device has a display panel and a field-sequential backlight module arranged opposite to the display panel. The display panel includes a light incident surface and a light exit surface arranged opposite to the light incident surface. The field-sequential backlight module is disposed at a side of the display panel close to the light incident surface, and includes a plurality of light sources of three different colors. The display panel include a first substrate, a second substrate disposed opposite to the first substrate, and a liquid crystal layer sandwiched between the first substrate and the second substrate. The liquid crystal layer is configured to enable the display device to switch between an opaque or translucent state and a transparent state without introducing any polarizers to the display device.

20 Claims, 9 Drawing Sheets

DISPLAY DEVICE AND DRIVING METHOD

CROSS-REFERENCES TO RELATED APPLICATIONS

This application claims the priority of Chinese Patent Application No. 201711019799.9, filed on Oct. 27, 2017, the entire contents of which are incorporated herein by reference.

FIELD OF THE DISCLOSURE

The present disclosure generally relates to the display technology and, more particularly, relates to a display device and a driving method thereof.

BACKGROUND

With the development of display technology, user demands for display devices become more and more diversified. In certain application scenarios, a display device is desired to have substantially high transparency, such as a glass window with a display function, a car window with a display function. Accordingly, transparent display technology has become one of the research and development directions of the display technology.

However, the light transmittance of an existing transparent display device is only about 30% and, more particular, the light transmittance of a backlight module in the existing transparent display device is substantially low, which may not meet the demands of the transparent display technology.

The disclosed display device and driving method thereof are directed to solve one or more problems set forth above and other problems.

BRIEF SUMMARY OF THE DISCLOSURE

One aspect of the present disclosure provides a display device. The display device has a display panel and a field-sequential backlight module arranged opposite to the display panel. The display panel includes a light incident surface and a light exit surface arranged opposite to the light incident surface. The field-sequential backlight module is disposed at a side of the display panel close to the light incident surface, and includes a plurality of light sources of three different colors. The display panel include a first substrate, a second substrate disposed opposite to the first substrate, and a liquid crystal layer sandwiched between the first substrate and the second substrate. The liquid crystal layer is configured to enable the display device to switch between an opaque or translucent state and a transparent state without introducing any polarizers to the display device.

Another aspect of the present disclosure provides a driving method for the disclosed display device. The driving method comprises: displaying, by the display device, N frames of images in one second (1 s), where N is an integer multiple of 3; in each of the N frames, emitting light, by only one of the first-color light source, the second-color light source, and the third-color light source; and in any three consecutive frames of the N frames, emitting light, by the first-color light source, the second-color light source, and the third-color light source, respectively, wherein images of the three consecutive frames are synthesized into one image observed by human eyes.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which are illustrated in the accompanying drawings. Hereinafter, embodiments consistent with the disclosure will be described with reference to drawings. In the drawings, the shape and size may be exaggerated, distorted, or simplified for clarity. Wherever possible, the same reference numbers will be used throughout the drawings to refer to the same or like parts, and a detailed description thereof may be omitted. It should be noted that the relative arrangement of the components and steps, the numerical expressions, and numerical values set forth in the exemplary embodiments do not limit the scope of the present disclosure unless it is specifically stated otherwise.

Further, in the present disclosure, the disclosed embodiments and the features of the disclosed embodiments may be combined under conditions without conflicts. It is apparent that the described embodiments are some but not all of the embodiments of the present disclosure. Based on the disclosed embodiments, persons of ordinary skill in the art may derive other embodiments consistent with the present disclosure, all of which are within the scope of the present disclosure.

Figure 1:
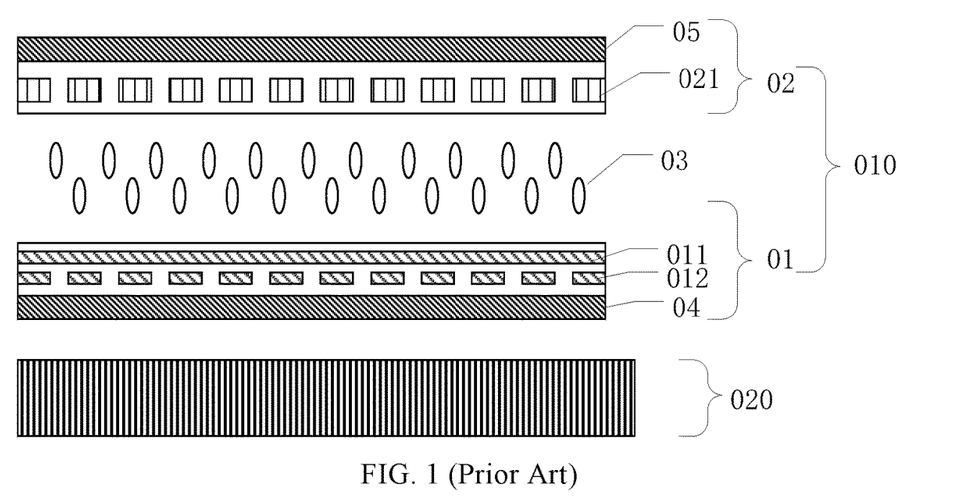
FIG. 1 illustrate a cross-sectional view of an existing transparent display device.

FIG. 1 illustrate a cross-sectional view of an existing transparent display device. As shown in FIG. 1, the existing transparent display device includes a display panel 010 and a backlight module 020. The display panel 010 itself does not emit light, and the backlight module 020 provides a light source for the display panel 010. The display panel 010 includes a first substrate 01, a second substrate 02 arranged opposite to the first substrate 01, and a liquid crystal layer 03 sandwiched between the first substrate 01 and the second substrate 02. The first substrate 01 includes a first polarizer 04, a plurality of pixel electrodes 012, and a common electrode 011. The second substrate 02 includes a plurality of color filters/color barriers 021 and a second polarizer 05.

The light emitted by the backlight module 020 sequentially passes through the first substrate 01, the liquid crystal layer 03 and the second substrate 02. To improve the transparency of the display panel 010, the color filters 021 are often made of a highly transparent material.

However, in the existing transparent display device, the structures that greatly affect the transmittance in the display panel include the first polarizer 04, the second polarizer 05, and the color filters 021. The light emitted by the backlight module 020 has about 40% light transmittance after passing through the first polarizer 04 and the second polarizer 05, and about 30-80% light transmittance after passing through the color filter 021. Thus, the light transmittance of the existing transparent display device is only about 30% (40%*80%=32%) and, more particular, the light transmittance of the backlight module 020 is substantially low, which may not meet the demands of the transparent display technology.

The present disclosure provides an improved display device and driving method thereof, which are capable of improving the light transmittance of the display device and thereby satisfying the demands of the transparent display technology.

Figure 2:
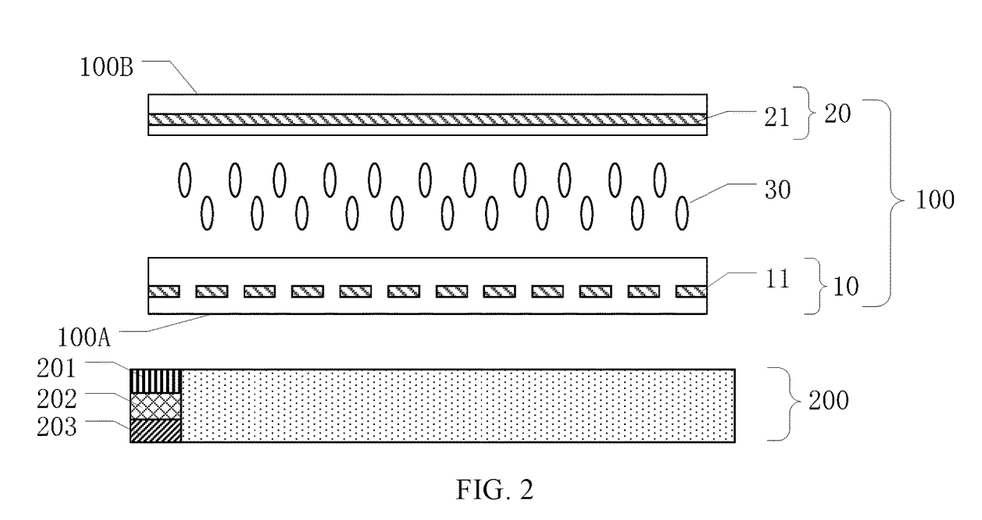
FIG. 2 illustrates a cross-sectional view of an exemplary display device consistent with disclosed embodiments.

FIG. 2 illustrates a cross-sectional view of an exemplary display device consistent with disclosed embodiments. As shown in FIG. 2, the display device may include a display panel 100 and a field-sequential backlight module 200 arranged opposite to the display panel 100. The display panel 100 may include a light incident surface 100A and a light exit surface 100B arranged opposite to the light incident surface 100A, for example, the light incident surface 100A may be arranged parallel to the light exit surface 100B, and the light incident surface 100A and the light exit surface 100B may be arranged at different sides of the display panel. The field-sequential backlight module 200 may be disposed at a side of the display panel 100 closer to the light incident surface 100A than the light exit surface 100B, for example, the light incident surface 100A may be arranged between the light exit surface 100B and the field-sequential backlight module 200.

The field-sequential backlight module 200 may include a plurality of color light sources of different colors which may be mixed together to generate white light. In one embodiment, the field-sequential backlight module 200 may include a plurality of color light sources of three different colors.

The display panel 100 may include a first substrate 10, a second substrate 20 disposed opposite to the first substrate 10, and a liquid crystal layer 30 sandwiched between the first substrate 10 and the second substrate 20. The liquid crystal layer 30 may be configured to enable the display device to switch between an opaque or translucent state for display images and a transparent state for fully transmitting the light emitted from the field-sequential backlight module 200. For example, the liquid crystal layer 30 may be configured to include polymer-dispersed liquid crystals (PDLCs), or polymer network liquid crystals (PNLCs).

In one embodiment, as shown in FIG. 2, the liquid crystal layer 30 may include polymer-dispersed liquid crystals (PDLCs). The first substrate 10 may include a plurality of pixels and a plurality of pixel electrodes 11. The second substrate 20 may include a common electrode 21.

In the disclosed embodiments, the display panel 100 may include the light incident surface 100A and the light exit surface 100B arranged opposite to the light incident surface 100A. The field-sequential backlight module 200 may be disposed on the side close to the light incident surface 100A, such that the light emitted by the field-sequential backlight module 200 may enter the display panel 100 at the light incident surface 100A, and exit the display panel 100 at the light exit surface 100B.

The field-sequential backlight module 200 may include light sources of three different colors which may be mixed together to generate white light. In one embodiment, as shown in FIG. 2, the light sources of the three different colors may include a first-color light source 201, a second-color light source 202, a third-color light source 203. The first-color light source 201, the second-color light source 202, and the third-color light source 203 may emit light in a time-division manner, such that the light sources of the three different colors may respectively enable the display panel 100 to display images in the three different colors.

That is, the first-color light source 201 may enable the display panel 100 to display a first-color image, the second-color light source 202 may enable the display panel 100 to display a second-color image, and the third-color light source 203 may enable the display panel 100 to display a third-color image, in the time-division manner. Thus, a full color display device may be realized in the display device without introducing color filters/barriers to the display device. That is, the disclosed display device may be free of color filters.

Further, the display panel 100 may include the first substrate 10 and the second substrate 20 opposite to each other. The first substrate 10 and the second substrate 20 each may be flexible or rigid. The first substrate 10 and the second substrate 20 may be made of a material with high transparency, thereby further improving the transmittance of the display device and satisfying the demands of the transparent display technology.

The liquid crystal layer 30 may be sandwiched between the first substrate 10 and the second substrate 20. The liquid crystal layer 30 may include polymer-dispersed liquid crystals (PDLC), in which micron-scaled LC droplets are dispersed in an organic solid polymer network. Without an electric field, the optical axis of the small LC droplet has a free orientation and the refractive index of the LCs does not match the refractive index of the polymer and, thus, the light emitted by the field-sequential backlight module 200 will be strongly scattered by the LC droplets when passing through the liquid crystal layer 30, resulting in an opaque state or a translucent state of the display device.

When an electric field is applied to the liquid crystal layer 30 including PDLCs, the optical axis orientation of the LC droplets may be adjusted, such that the refractive index of the LCs may match the refractive index of the polymer, resulting a transparent state of the display device. When the applied electric field is removed, the LC droplets will restore the original scatting state to display images. Thus, polarizers may not be introduced to the disclosed display device for displaying images, instead, the disclosed display device may be able to display images with different transparency by simply adjusting the electric field applied to the liquid crystal layer 30. That is, the display device may be able to display different grayscale images.

In the disclosed embodiments, the pixel electrodes 11 may be disposed on the first substrate 10, and the common electrode 21 may be disposed on the second substrate 20. Through applying a voltage to the pixel electrode 11 and the common electrode 21 respectively, an electric filed may be formed between the pixel electrode 11 and the common electrode 21, which may control the reorientation of the LC molecules in the PDLCs, thereby displaying images of different transparency.

In the disclosed embodiments, the first substrate 10 may include the plurality of pixels and the plurality of pixel electrodes 11. In the existing display device, each pixel often includes three sub-pixels, each sub-pixel includes a pixel electrode, and the three sub-pixels display three different colors. In the existing display device, various elements, such as a signal line and a driving transistor, have to be correspondingly provided for each sub-pixel and, thus, the transmittance of the display panel is substantially low.

As a comparison, in the disclosed embodiments, sub-pixels may be no longer arranged in the pixel, i.e., the pixel may be no longer divided into three sub-pixels. Thus, each pixel may only include one pixel electrode, instead of three pixel electrodes in the existing display device. Thus, the disclosed display device may have higher light transmittance than the existing display device. That is, the disclosed display device may be able to improve the transmittance of the display device, as compared to the existing display device.

In the disclosed embodiments, because polarizers and color filters are no longer introduced to the display device, given the light transmittance of the field-sequential backlight module 200 is about 90% and the light transmittance of the display panel 100 is about 90%, the light transmittance of the display device may reach approximately 80% (90%*90%=81%), which may satisfy the demands of the transparent display technology.

In the disclosed embodiments, the display panel may include PDLCs, such that images of different gray scale may be displayed, without introducing the polarizers to the display panel. Moreover, the display device may include the field-sequential backlight module, such that images in different colors may be displayed without introducing the color filters to the display panel. Because the disclosed display panel does not include any polarizers and any color filters, i.e., the disclosed display panel is polarizer-free and color-filter-free, the light transmittance of the disclosed display device may be significantly improved as compared to the existing display device, thereby satisfying the demands of the transparent display technology.

In one embodiment, as shown in FIG. 2, the field-sequential backlight module 200 may include a red light source 201, a green light source 202, and a blue light source 203. The display device may display N frames of images in one second (1 s), where N is an integer multiple of 3. For example, the display device may display 60 frames of images, 90 frames of images, 180 frames of images, etc., in one second. N may be any appropriate numbers as long as N is an integer multiple of 3, which is not limited by the present disclosure.

In each frame, only one of the red light source 201, the green light source 202, and the blue light source 203 may emit light. In any three consecutive frames of the N frames, the red light source 201, the green light source 202 and the blue light source 203 may emit light respectively. When the red light source 201 emits light, the image displayed by the display device is red; when the green light source 202 emits light, the image displayed by the display device is green; and when the blue light source 203 emits light, the image displayed by the display device is blue.

It is understood that, on one hand, red, green, and blue are three primary colors of light, and the combination of red, green, and blue colors can realize all of most colors. On the other hand, human eye has a function of persistence of vision, which refers to the optical illusion that occurs when visual perception of an object does not cease for some time after the rays of light proceeding from it have ceased to enter the eye. Based on the persistence of vision, a red image, a green image, and a blue image in three consecutive frames may be synthesized into one image including multiples colors. When the user watches the display device, because the duration time of one frame is substantially short (e.g., 0.0083 s when 120 frames are displayed in 1 s), the image observed by the user is usually a composite image of a red image, a green image and a blue image, rather than a single-color image. In the disclosed embodiments, through configuring the field-sequential backlight module 200 to include the red light source 201, the green light source 202 and the blue light source 203, the display device may be able to display images of multiple colors based on the persistence of vision of human eyes.

The number of the light sources, the arrangement of the light sources, and the color of the light sources are for illustrative purposes, and are not intended to limit the scope of the present disclosure. In practical applications, the number of the light sources and/or the arrangement of the light sources and/or the color of the light sources may be determined according to various application scenarios.

Further, the light sources may be arranged in any appropriate positions in the field-sequential backlight module 200. For example, in one embodiment, as shown in FIG. 2, the light sources may be arranged at the left side surface of the field-sequential backlight module 200, in another embodiment, the light sources may be arranged at any appropriate surfaces of the field-sequential backlight module 200.

FIG. 2 shows the number of the light sources is three, in another embodiment, the number of the light sources may be more than three. For example, six light sources may be arranged in the field-sequential backlight module 200, in which three light sources are arranged at the left side surface of the field-sequential backlight module 200, and the remained three light sources are arranged the right side surface of the field-sequential backlight module 200.

FIG. 2 shows the field-sequential backlight module 200 may include red, green and blue color light sources, in another embodiment, the field-sequential backlight module 200 may include light sources in any appropriate colors, as long as the display device is able to display images of multiple colors based on the persistence of vision of human eyes. For example, the field-sequential backlight module 200 may include red, green, blue and yellow color light sources.

Further, the light sources included in the field-sequential backlight module 200 may have any appropriate light-emitting structures. For example, the light sources included in the field-sequential backlight module 200 may be LEDs, OLEDs, LEDs/OLEDs plus fluorescent material/quantum dots, which are not limited by the present disclosure.

The first substrate in the display device may have various structures, and certain exemplary structures will be explained in FIGS. 3-9.

Figure 3:
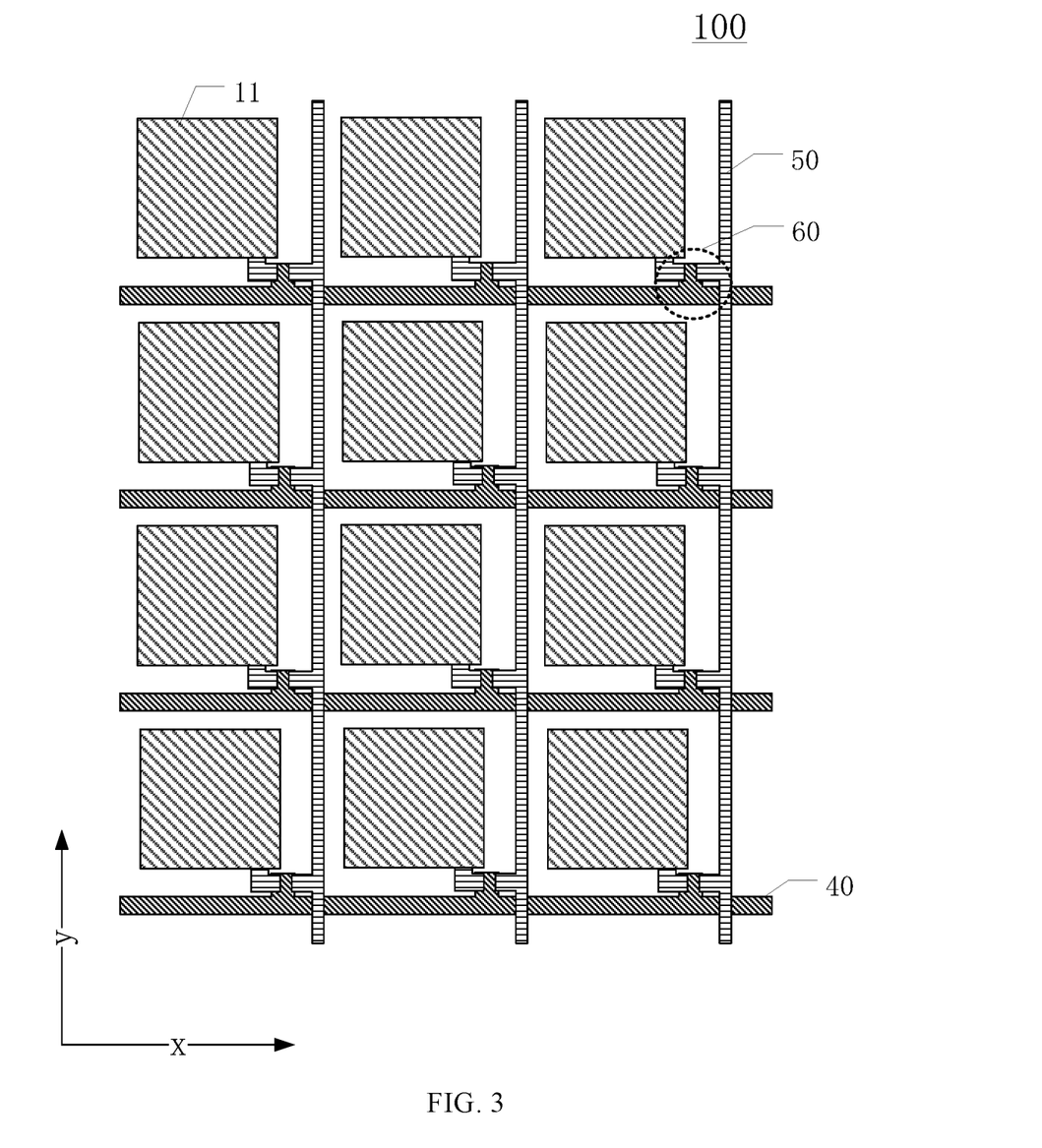
FIG. 3 illustrates a top view of an exemplary first substrate in an exemplary display device consistent with disclosed embodiments.

FIG. 3 illustrates a top view of an exemplary first substrate in an exemplary display device consistent with disclosed embodiments. As shown in FIG. 3, the first substrate 100 may include a plurality of scanning lines 40 extending along a first direction X and arranged along a second direction Y, and a plurality of data lines 50 extending along the second direction Y and arranged along the first direction X. The second direction Y may intersect the first direction X. In one embodiment, as shown in FIG. 3, the first direction X may be perpendicular to the second direction Y.

The first substrate 100 may further include a plurality of thin-film transistors (TFTs) 60, which may be disposed one-to-one corresponding to the plurality of the pixel electrodes 11. The pixel electrode 11 may be electrically connected to the corresponding TFT 60.

In one embodiment, as shown in FIG. 3, the first substrate 100 may be an array substrate, and may include the plurality of TFTs 60 arranged in an array. The TFT may include a gate, a source and a drain, in which the gate may be electrically connected to the scanning line 40, the source may be electrically connected to the data line 50, and the drain may be electrically connected to the pixel electrode 11. The plurality of pixel electrodes 11 may be arranged along the first direction X and the second direction Y, forming a pixel electrode array and simplifying the manufacturing process.

Figure 4:
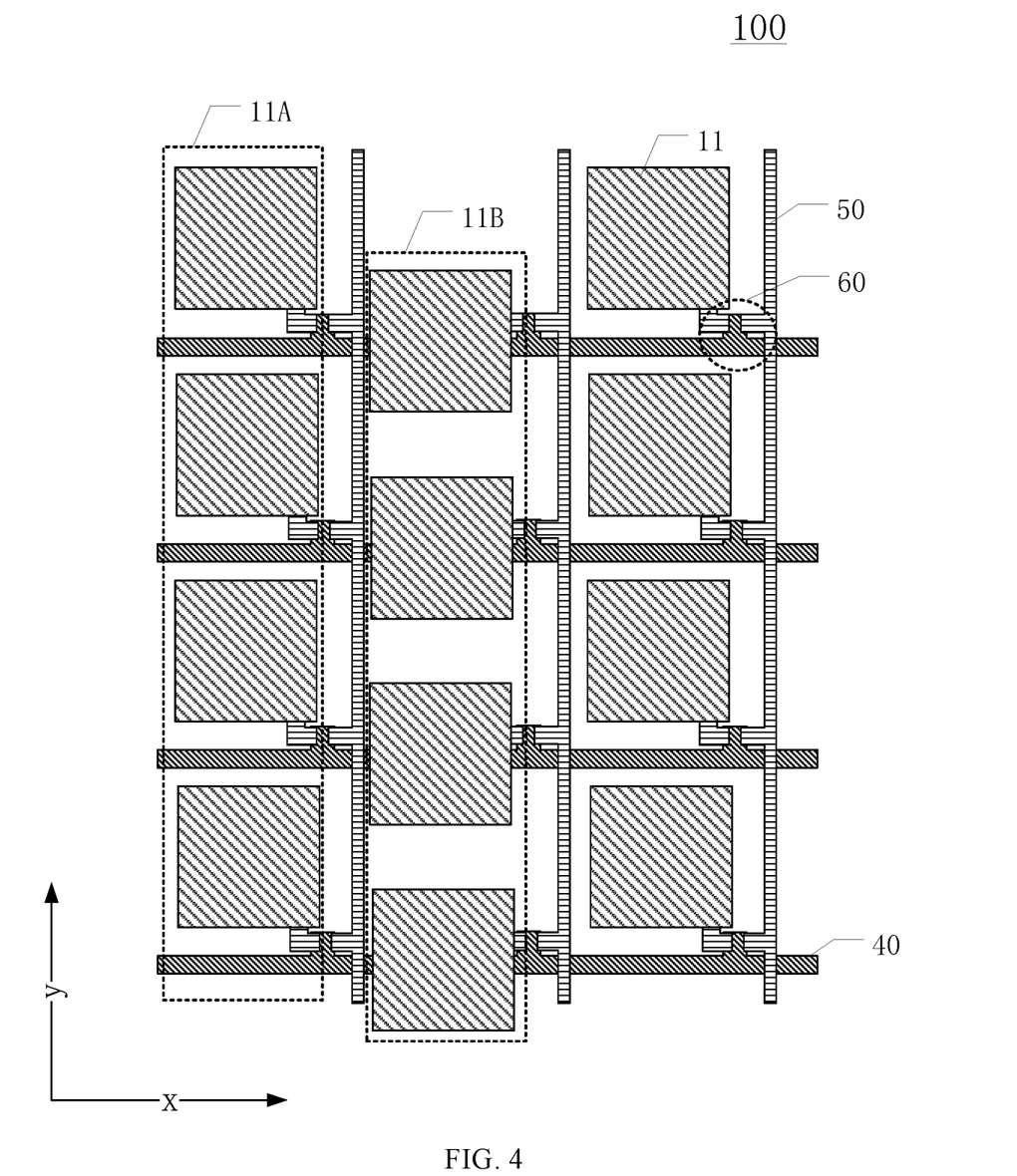
FIG. 4 illustrates a top view of another exemplary first substrate in an exemplary display device consistent with disclosed embodiments.

FIG. 4 illustrates a top view of another exemplary first substrate in an exemplary display device consistent with disclosed embodiments. The similarities between FIG. 4 and FIG. 3 are not repeated here, while certain differences may be explained.

As shown in FIG. 4, the plurality of pixel electrodes 11 may include a plurality of first pixel electrode columns 11A and a plurality of second pixel electrode columns 11B alternately arranged in the first direction X. The first pixel electrode columns 11A and second pixel electrode columns 11B may extend in the second direction Y. That is, along the second direction Y, the pixel electrodes 11 arranged in the same column may form a pixel electrode column. Accordingly, the the plurality of pixel electrodes 11 may include a plurality of pixel electrode columns, which may include the first pixel electrode columns 11A and the second pixel electrode columns 11B.

The pixel electrode 11 in the first pixel electrode column 11A may be confined in an area defined by two adjacent scanning lines 40 and two adjacent data lines 50. The pixel electrode 11 in the second pixel electrode column 11B may be confined in an area defined by two adjacent data lines 50 and, meanwhile, the pixel electrode 11 in the second pixel electrode column 11B may overlap with the scanning line 40.

Because color filters are not introduced to the disclosed display device, the alignment between the pixel electrodes 11 and the color filters may be no longer taken into account as compared to the existing display devices. Thus, the arrangement of the pixel electrodes 11 may become more flexible and diversified. In addition, in the first direction X, the plurality of pixel electrodes 11 may be staggered, such that the color mixing may be enhanced when displaying images, the various display demands of different display devices may be satisfied, and the display performance of the display device may be enhanced.

In the display devices shown in FIGS. 3 and 4, the pixel electrode 11 has a rectangular shape, which is for illustrative purposes and are not intended to limit the scope of the present disclosure. In practical applications, the shape of the pixel electrode 11 and the arrangement/layout of the pixel electrodes 11 may be determined according to various application scenarios. The pixel electrodes 11 may have any appropriate shapes and any appropriate arrangement/layout.

Figure 5:
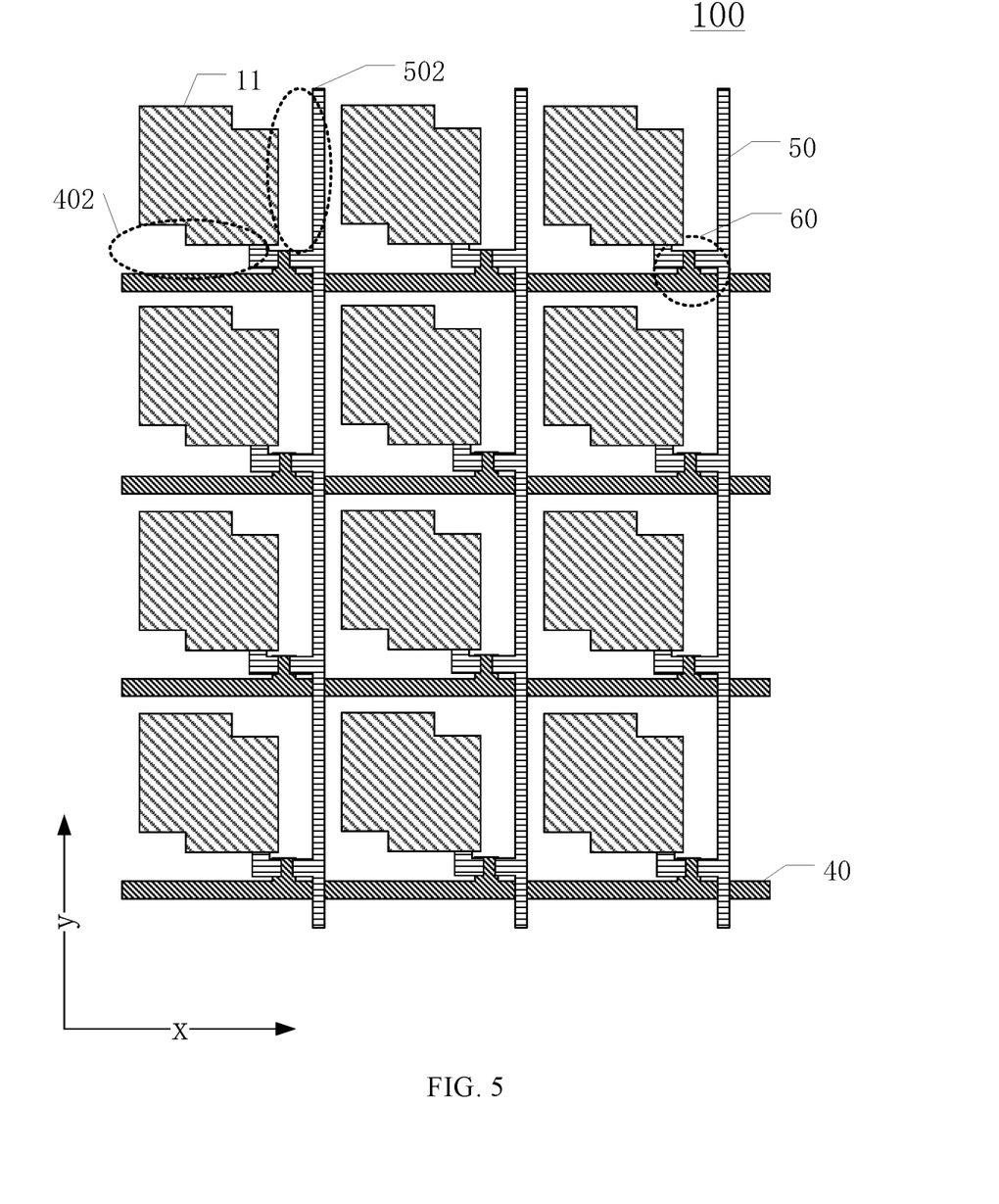
FIG. 5 illustrates a top view of another exemplary first substrate in an exemplary display device consistent with disclosed embodiments.

FIG. 5 illustrates a top view of another exemplary first substrate in an exemplary display device consistent with disclosed embodiments. The similarities between FIG. 3 and FIG. 5 are not repeated here, while certain differences may be explained.

As shown in FIG. 5, the pixel electrode 11 may have an irregular octagonal shape. The pixel electrode 11 and the adjacent scanning line 40 may be spaced by a gap 402, and the pixel electrode 11 and the adjacent data line 50 may be spaced by a gap 502. Electrodes may not be provided in the gaps 502, 402 and, thus, an electric field for reorienting the LC molecules may be not formed in the gaps 502, 402. That is, the gaps 502, 402 may be transparent gaps 502, 402, which remain in a transparent state all the time. Through forming the transparent gap 502 between the pixel electrode 11 and the adjacent data line 50, as well as the transparent gap 402 between the pixel electrode 11 and the adjacent scanning line 40, the light transmittance of the display panel may be further improved.

In another embodiment, the pixel electrode may have a shape different from the irregular octagonal shape shown in FIG. 5, such as a pentagonal shape, or a hexagon shape, which is not limited by the present disclosure.

Figure 6:
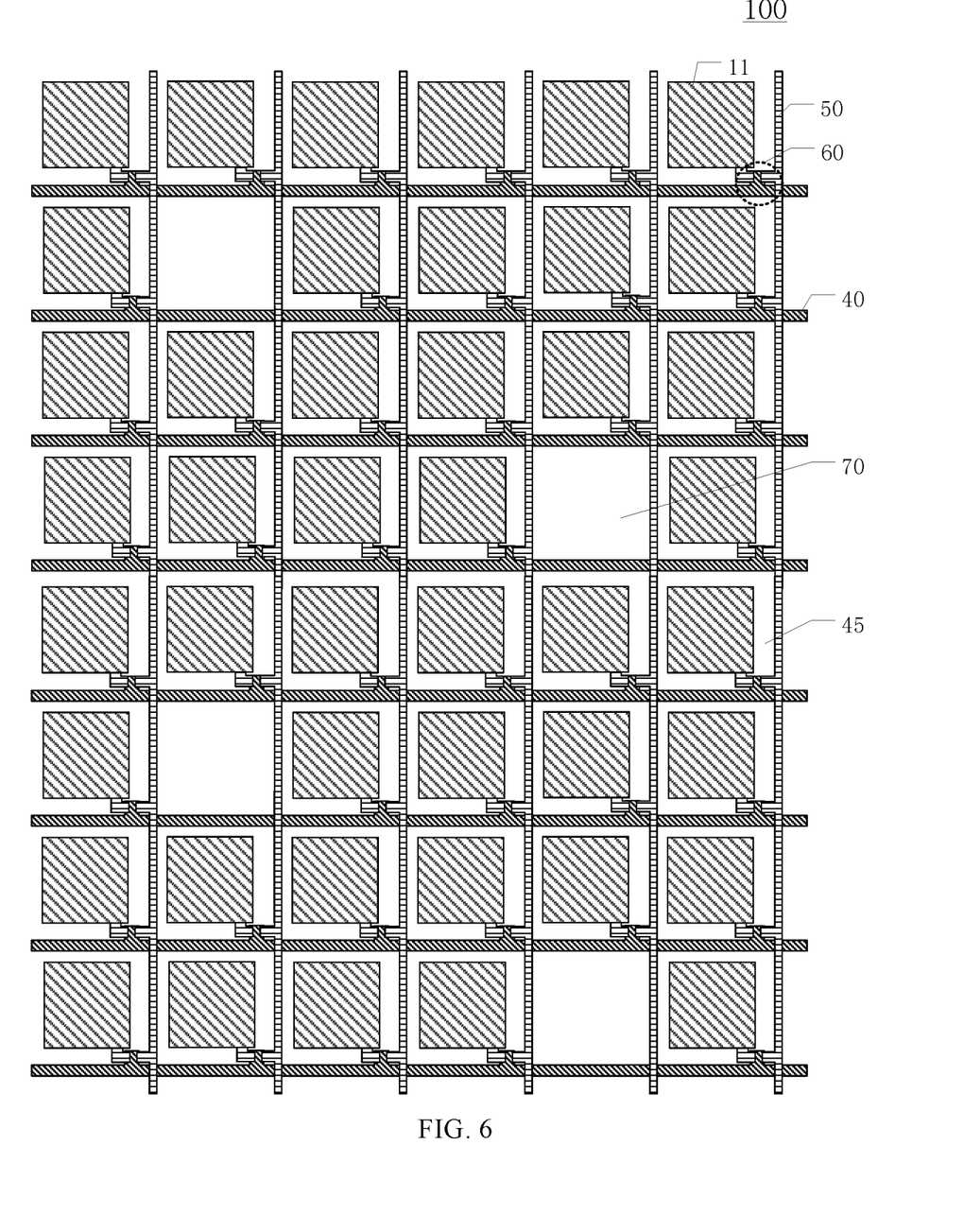
FIG. 6 illustrates a top view of another exemplary first substrate in an exemplary display device consistent with disclosed embodiments.

FIG. 6 illustrates a top view of another exemplary first substrate in an exemplary display device consistent with disclosed embodiments. The similarities between FIG. 6 and FIG. 5 are not repeated here, while certain differences may be explained.

As shown in FIG. 6, the display device may include a plurality of long transparent regions 70 without being disclosed with any pixel electrodes 11 and any thin film transistors 60. The long transparent regions 70 may further improve the light transmittance of the display device. Because the pixel electrode 11 is not provided in the long transparent region 70, the liquid crystal layer in the long transparent region 70 may be no longer affected by the electric field generated between the pixel electrode 11 and the common electrode. That is, the long transparent region 70 may remain in a transparent state all the time, thereby further improving the light transmittance of the display device.

Further, the plurality of scanning lines 40 may intersect the plurality of data lines 50 to define a plurality of pixel regions 45. The pixel electrode 11 may be disposed in the pixel region 45. The pixel region 45 without being disclosed with any pixel electrodes 11 and any thin film transistors 60 may be the long transparent region 70.

The size of the long transparent region 70 may be determined to different application scenarios. In one embodiment, as shown in FIG. 6, the long transparent region 70 without being disclosed with any pixel electrodes 11 and any thin film transistors 60 may be arranged in the pixel region 45 defined by the intersected scanning line 40 and data line 50. That is, the size of one long transparent region 70 may be equal to the size of one pixel region 45. When the size of the long transparent region 70 is substantially large, the display performance of the display device may be affected because the effective display area may be reduced. When the size of the long transparent region 70 is substantially small, the improvement of the light transmittance may be not obvious.

By configuring the size of the long transparent region 70 to be approximately equal to the size of the pixel region 45, the influence on the display performance of the display device may be substantially small, while the light transmittance of the display device may be effectively improved. In addition, the long transparent region 70 may be formed without fabricating the pixel electrode 11 and the corresponding thin film transistor 60 in the long transparent region 70 and, thus, the manufacturing process may be simple without degrading the production efficiency of the display devices.

Figure 7:
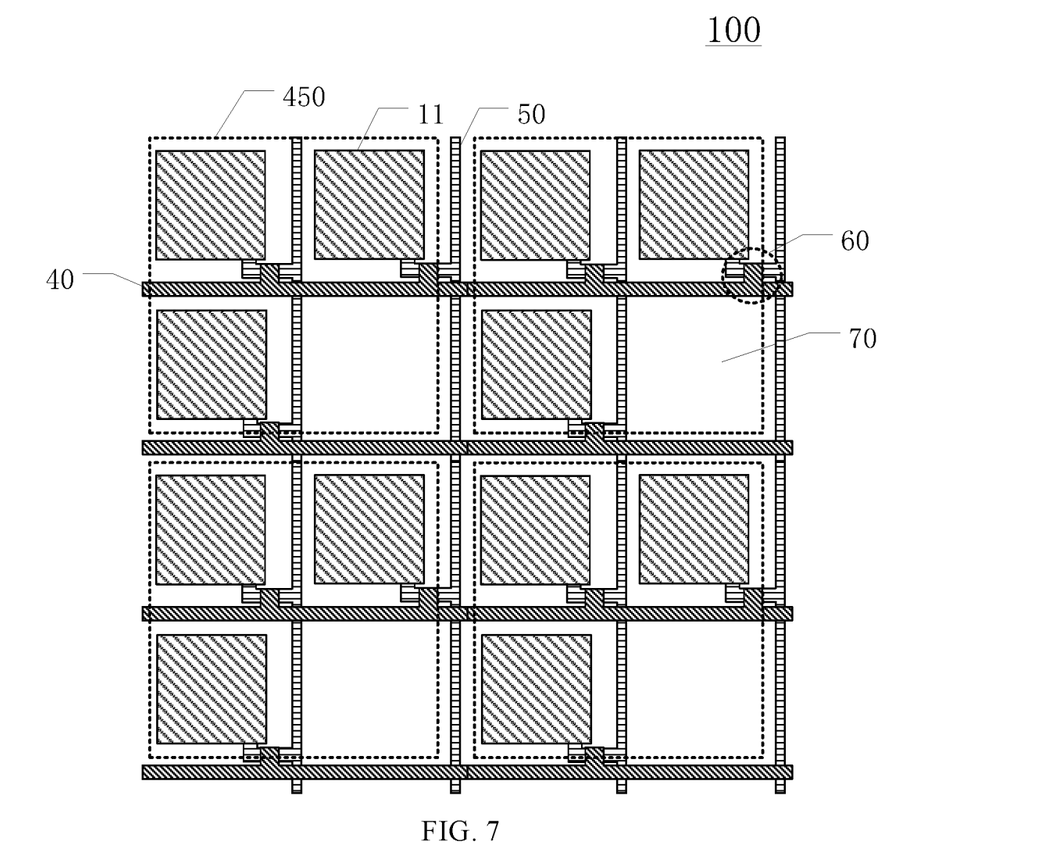
FIG. 7 illustrates a top view of another exemplary first substrate in an exemplary display device consistent with disclosed embodiments.
Figure 8:
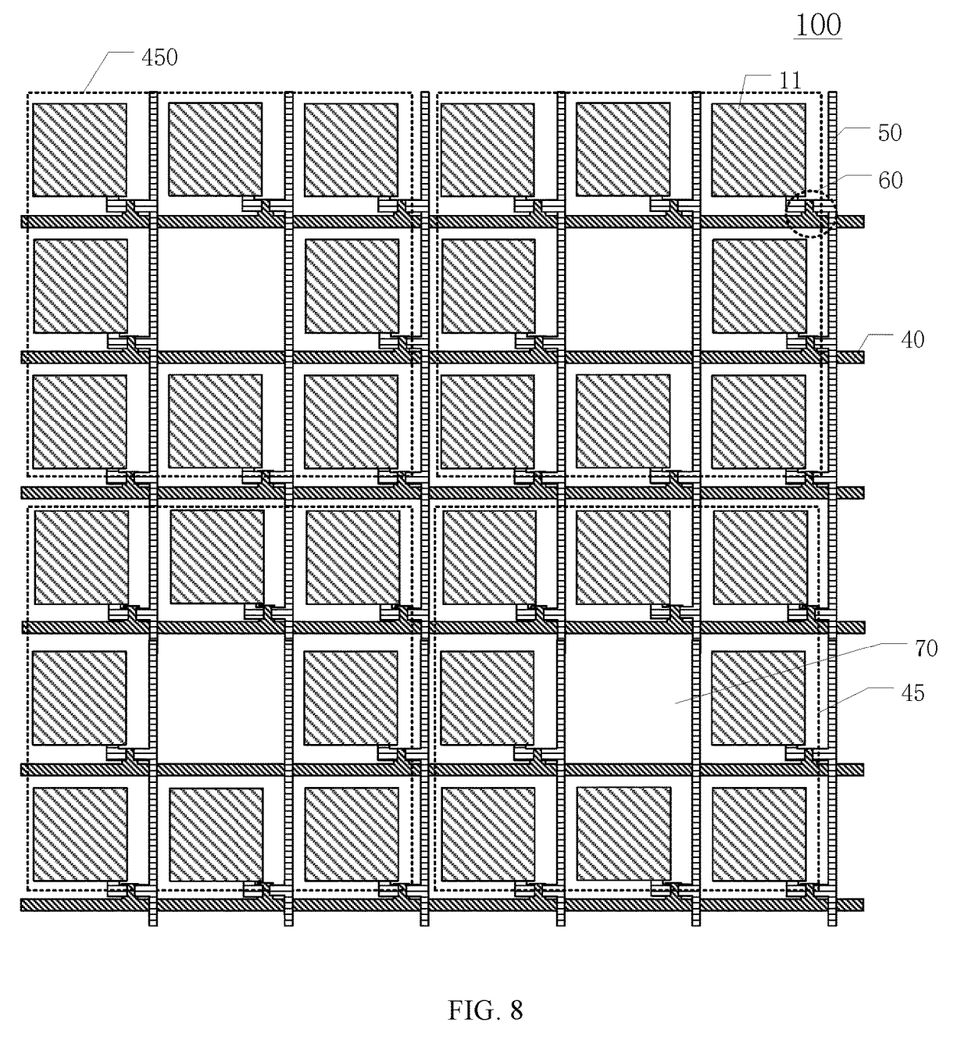
FIG. 8 illustrates a top view of another exemplary first substrate in an exemplary display device consistent with disclosed embodiments.
Figure 9:
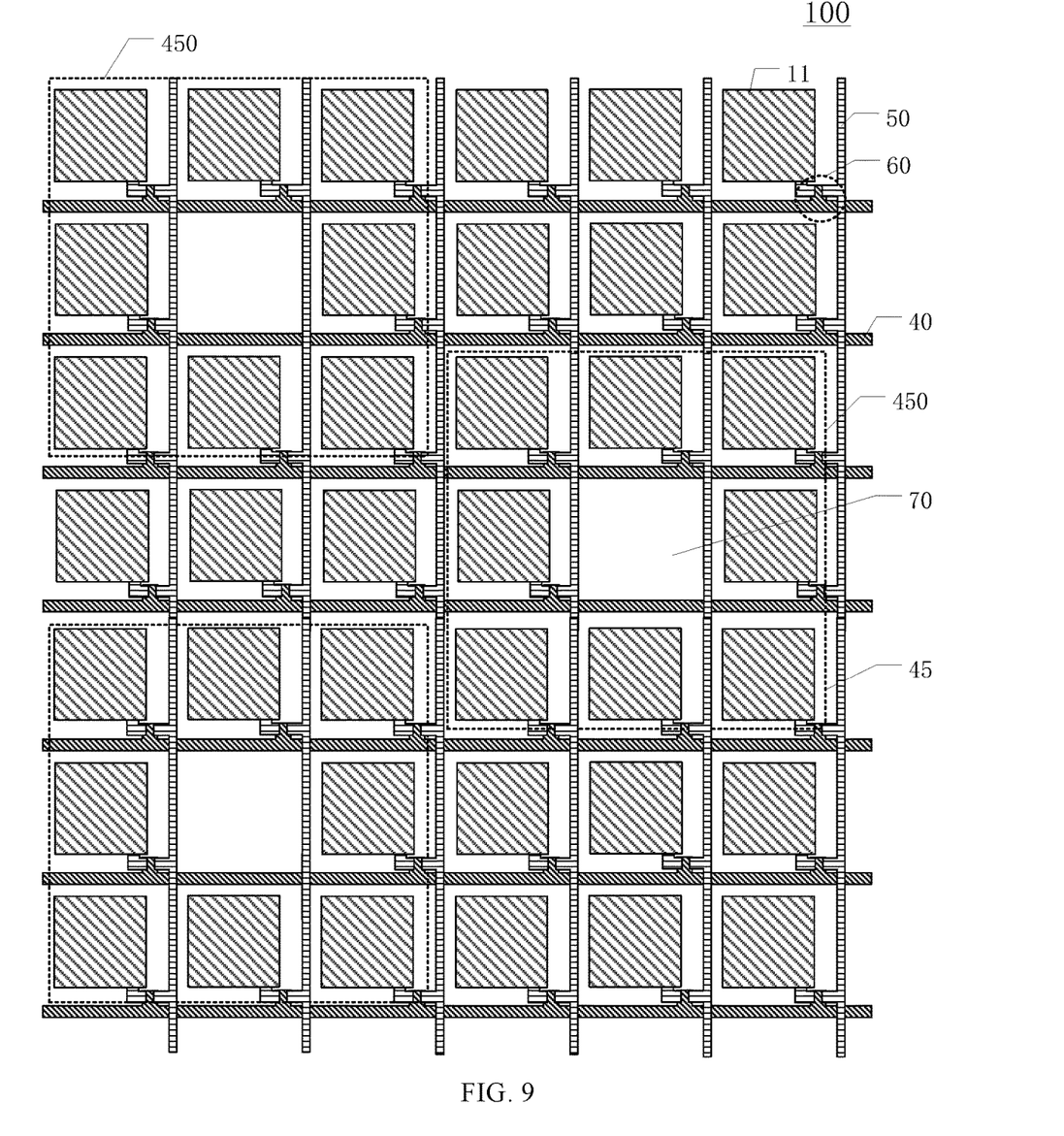
FIG. 9 illustrates a top view of another exemplary first substrate in an exemplary display device consistent with disclosed embodiments.

FIGS. 7-9 illustrate top views of exemplary first substrates in an exemplary display device consistent with disclosed embodiments. The similarities between FIG. 6 and FIGS. 7-9 are not repeated here, while certain differences may be explained.

As shown in FIG. 7, a plurality of pixel regions 45 may include a plurality of pixel groups 450. The pixel group 450 may include M number of pixel regions 45 and one long transparent region 70, where M is a positive integer and M≥4.

FIG. 7 shows the first substrate may include four pixel groups 450, which is for illustrative purposes and is not intended to limit the scope of the present disclosure. In practical applications, the first substrate 100 in the display device may include any appropriate number of pixel groups 450. For example, the first substrate 100 in the display device may include five pixel groups 450, six pixel groups 450, seven or more than seven pixel groups 450.

Figure 10:
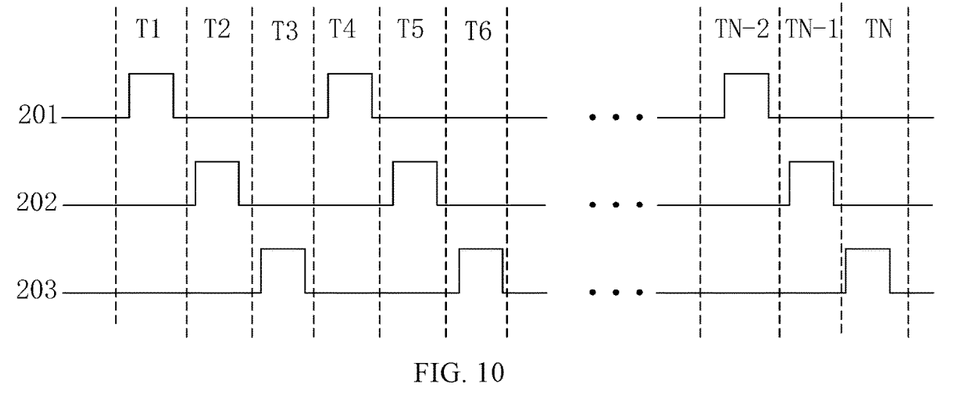
FIG. 10 illustrates an exemplary driving scheme of an exemplary display panel driving method consistent with disclosed embodiments.

FIG. 7 shows each pixel group 450 may include four pixel regions 45 and one long transparent region 70, which is for illustrative purposes and is not intended to limit the scope of the present disclosure. In practical applications, the pixel group 450 may include four or more than four pixel regions 45. For example, as shown in FIG. 10, the pixel group 450 may include nine pixel regions 45.

In the disclosed embodiments, only one long transparent region 70 may be disposed in each pixel group 450, such that the distribution of the plurality of long transparent regions 70 may be substantially uniform and, accordingly, the display effect of the display device may be substantially uniform. In another embodiment, more than one long transparent regions 70 may be disposed in each pixel group 450, which is not limited by the present disclosure.

The plurality of pixel groups 450 may have various arrangement/layout. For example, in the display device shown in FIGS. 7 and 8, the pixel groups 450 may be arranged in an array, and the plurality of pixel groups 450 may be directly adjacent to each other. That is, the pixel regions 45 may not be disposed between two adjacent pixel groups 450. In another embodiment, referring to FIG. 9, the pixel groups 450 and the pixel regions 45 may be alternately arranged. In particular, at least one pixel region 45 may be disposed between two adjacent pixel groups 450. The arrangement/layout of the plurality of pixel groups 450 may be determined according to various application, and is not limited by the present disclosure.

The present disclosure also provides a driving method for a display device.

Referring to FIG. 2, the display device may include the display panel 100 and the field-sequential backlight module 200 arranged opposite to the display panel 100. The display panel 100 may include the light incident surface 100A and the light exit surface 100B arranged opposite to the light incident surface 100A. The field-sequential backlight module 200 may be disposed on the side closer to the light incident surface 100A than the light exit surface 100B.

The field-sequential backlight module 200 may include the plurality of color light sources of three different colors. In one embodiment, the field-sequential backlight module 200 may include the first-color light source 201, the second-color light source 202, the third-color light source 203.

The display panel 100 may include the first substrate 10, the second substrate 20 disposed opposite to the first substrate 10, and the liquid crystal layer 30 sandwiched between the first substrate 10 and the second substrate 20. The liquid crystal layer 30 may include polymer-dispersed liquid crystals (PDLCs). The first substrate 10 may include the plurality of pixels and the plurality of pixel electrodes 11. The second substrate 20 may include the common electrode 21.

FIG. 10 illustrates an exemplary driving scheme of an exemplary display panel driving method consistent with disclosed embodiments.

Referring to FIG. 2 and FIG. 10, the driving method for the display panel may include:

displaying, by the display device, N frames of images in one second (1 s), where N is an integer multiple of 3;

in each frame, emitting light, by only one of the first-color light source 201, the second-color light source 202, and the third-color light source 203;

in any three consecutive frames of the N frames displayed in one second, emitting light, by the first-color light source 201, the second-color light source 202 and the third-color light source 203, respectively, wherein images of the three consecutive frames are synthesized into one image observed by the human eyes.

In particular, during the operation of the display device, N frames of images may be displayed in one second, and the duration time of each frame is 1/N second.

FIG. 10 illustrates an exemplary driving scheme of the first-color light source 201, the second-color light source 202, the third-color light source 203 in the field-sequential backlight module 200. As shown in FIG. 10, T1 denotes the duration time of the first frame, T2 denotes the duration time of the second frame, . . . TN−1 denotes the duration time of the (N−1)-th frame, and TN denotes the duration time of the N-th frame. Among the waveforms of the first-color light source 201, the second-color light source 202, and the third-color light source 203, a peak indicates that a light source of a corresponding color receives an electrical signal thereby emitting light.

In one embodiment, in the duration time T1 in the first frame, the light source of the first-color light source 201 may emit light; in the duration time T2 of the second frame, the second-color light source 202 may emit light; in the duration time T3 of the third frame, the third-color light source 203 may emit light; . . . , in the during time of the (N−2)-th frame, the first-color light source 201 may emit light, in the during time of the (N−1)-th frame, the second-color light source 202 may emit light, and in the during time of the N-th frame, the third-color light source 203 may emit light. That is, during the operation of the display device, the first-color light source 201, the second-color light source 202, and the third-color light source 203 may emit light sequentially. In any three consecutive frames of the N frames displayed in one second, the first-color light source 201, the second-color light source 202, and the third-color light source 203 may emit light, respectively.

In the disclosed embodiments, the field-sequential backlight module 200 may provide a light source for the display panel 100. The field-sequential backlight module 200 may include the first-color light source 201, the second-color light source 202, and the third-color light source 203. In each frame, only the light sources emitting light in the same single color may emit light in the field-sequential backlight module 200. That is, in each frame, the field-sequential backlight module 200 may only emit light of one color, such that the display device may display a single color image in each frame.

For example, in one frame, the first-color light source 201 may emit light, and the display device may display a first-color image, accordingly. Based on the persistence of vision of human eyes, three consecutive frames of images may be synthesized into one image to be observed by the human eyes, and the one image to be observed by the human eyes is an image that the display device desires to display.

According to the disclosed driving method for the display device, the display device may exhibit substantially high light transmittance. In addition, through utilizing the persistence of vision, three consecutive frames of images may be synthesized into one image to be observed by the human eyes, enabling the display device to display images of rich colors.

In one embodiment, the three different color light sources may include a red light source, a green light source, and a blue light source. The red, green, and blue are three primary colors of light, and the combination of red, green, and blue colors may be able to realize all of most colors. Accordingly, the disclosed display device may be able to display images of multiple colors.

In the disclosed embodiments, on one hand, the display panel may include PDLCs, such that different gray scale images may be displayed without introducing the polarizers to the display panel. On the other hand, the display device may include the field-sequential backlight module, such that images in different colors may be displayed without introducing the color filters to the display panel. Because the disclosed display panel does not include any polarizers and any color filters, the light transmittance of the disclosed display device may be significantly improved as compared to the existing display device, thereby satisfying the demands of the transparent display technology.

According to the disclosed driving method for the display device, the display device may exhibit substantially high light transmittance. In addition, through utilizing the persistence of vision, three consecutive frames of images may be synthesized into one image to be observed by the human eyes, enabling the display device to display images of rich colors.

Various embodiments have been described to illustrate the operation principles and exemplary implementations. It should be understood by those skilled in the art that the present disclosure is not limited to the specific embodiments described herein and that various other obvious changes, rearrangements, and substitutions will occur to those skilled in the art without departing from the scope of the disclosure. Thus, while the present disclosure has been described in detail with reference to the above described embodiments, the present disclosure is not limited to the above described embodiments, but may be embodied in other equivalent forms without departing from the scope of the present disclosure, which is determined by the appended claims.

What is claimed is:

1. A display device, comprising:
    a display panel, including a light incident surface and a light exit surface arranged opposite to the light incident surface; and
    a field-sequential backlight module, arranged opposite to the display panel, wherein the field-sequential backlight module is disposed at a side of the display panel close to the light incident surface, and includes a plurality of light sources of three different colors, wherein:
    the display panel include a first substrate, a second substrate disposed opposite to the first substrate, and a liquid crystal layer sandwiched between the first substrate and the second substrate,
    the second substrate includes a common electrode,
    the first substrate includes:
        a plurality of pixels and a plurality of pixel electrodes;
        a plurality of scanning lines extending along a first direction and arranged along a second direction;
        a plurality of data lines extending along the second direction and arranged along the first direction;
        a plurality of thin-film transistors (TFTs) one-to-one corresponding to the plurality of pixel electrodes, wherein a pixel electrode is electrically connected to a corresponding TFT; and
        a plurality of long transparent regions without being disposed with any pixel electrodes and any TFTs; and
    the liquid crystal layer is configured to enable the display device to switch between an opaque or translucent state and a transparent state, without including any polarizers in the display device,
    the plurality of scanning lines intersect the plurality of data lines to define a plurality of pixel regions,
    the pixel electrode is disposed in a pixel region,
    the pixel region without being disposed with the any pixel electrodes and the any TFTs is a long transparent region,
    the plurality of pixel regions include a plurality of pixel groups, and
    a pixel group includes M number of pixel regions and one long transparent region, where M is a positive integer and M≥4.

2. The display device according to claim 1, wherein:
    the liquid crystal layer includes polymer-dispersed liquid crystals (PDLCs).

3. The display device according to claim 1, wherein:
    the plurality of light sources of three different colors of the field-sequential backlight module includes a red light source, a green light source, and a blue light source.

4. The display device according to claim 3, wherein:
    the display device displays N frames of images in one second (1 s), where N is an integer multiple of 3;
    in each of the N frames, only one of the red light source, the green light source, and the blue light source emits light; and
    in any three consecutive frames of the N frames, the red light source, the green light source and the blue light source emit the light, respectively.

5. The display device according to claim 1, wherein:
    the plurality of pixel electrodes are arranged along the first direction and the second direction to form a pixel electrode array.

6. The display device according to claim 1, wherein:
    the plurality of pixel electrodes include a plurality of first pixel electrode columns and a plurality of second pixel electrode columns alternately arranged in the first direction,
    wherein the pixel electrode in a first pixel electrode column is confined in an area defined by two adjacent scanning lines and two adjacent data lines, and
    the pixel electrode in a second pixel electrode column is confined in an area defined by two adjacent data lines and, meanwhile, the pixel electrode in a second pixel electrode column overlaps with a scanning line.

7. The display device according to claim 1, wherein:
    the plurality of pixel groups are arranged in an array, and the pixel region is not disposed between two adjacent pixel groups.

8. The display device according to claim 1, wherein:
the plurality of pixel groups and the plurality of pixel regions are alternately arranged, and at least one of the plurality of pixel regions is disposed between two adjacent pixel groups.

9. The display device according to claim 1, wherein:
the display device is color filter free.

10. The display device according to claim 1, wherein:
one pixel only includes one pixel electrode.

11. A driving method for a display panel, wherein the display panel includes a light incident surface and a light exit surface arranged opposite to the light incident surface; and a field-sequential backlight module, arranged opposite to the display panel, wherein the field-sequential backlight module is disposed at a side of the display panel close to the light incident surface, and the field-sequential backlight module includes a plurality of light sources of three different colors including a first-color light source, a second-color light source, and a third-color light source, wherein the display panel include a first substrate, a second substrate disposed opposite to the first substrate, and a liquid crystal layer sandwiched between the first substrate and the second substrate, the second substrate includes a common electrode, the first substrate includes: a plurality of pixels and a plurality of pixel electrodes; a plurality of scanning lines extending along a first direction and arranged along a second direction; a plurality of data lines extending along the second direction and arranged along the first direction; a plurality of thin-film transistors (TFTs) one-to-one corresponding to the plurality of pixel electrodes, wherein a pixel electrode is electrically connected to a corresponding TFT; and a plurality of long transparent regions without being disposed with any pixel electrodes and any TFTs; and the liquid crystal layer is configured to enable the display device to switch between an opaque or translucent state and a transparent state without including any polarizers in the display device, the plurality of scanning lines intersect the plurality of data lines to define a plurality of pixel regions, the pixel electrode is disposed in a pixel region, the pixel region without being disposed with the any pixel electrodes and the any TFTs is a long transparent region, the plurality of pixel regions include a plurality of pixel groups, and a pixel group includes M number of pixel regions and one long transparent region, where M is a positive integer and M≥4, wherein the driving method comprises:

displaying, by the display device, N frames of images in one second (1 s), where N is an integer multiple of 3;

in each of the N frames, emitting light, by only one of the first-color light source, the second-color light source, and the third-color light source; and in any three consecutive frames of the N frames, emitting light, by the first-color light source, the second-color light source, and the third-color light source, respectively, wherein images of the three consecutive frames are synthesized into one image observed by human eyes.

12. The driving method according to claim 11, wherein:
the plurality of light sources of the three different colors include a red light source, a green light source, and a blue light source.

13. The driving method according to claim 11, wherein:
the liquid crystal layer includes polymer-dispersed liquid crystals (PDLCs).

14. The driving method according to claim 11, wherein:
the display device is color filter free.

15. The driving method according to claim 12, wherein:
the display device displays N frames of images in one second (1 s), where N is an integer multiple of 3;

in each of the N frames, only one of the red light source, the green light source, and the blue light source emits light; and in any three consecutive frames of the N frames, the red light source, the green light source and the blue light source emit the light, respectively.

16. The driving method according to claim 11, wherein:
the plurality of pixel electrodes are arranged along the first direction and the second direction to form a pixel electrode array.

17. The driving method according to claim 11, wherein:
the plurality of pixel electrodes include a plurality of first pixel electrode columns and a plurality of second pixel electrode columns alternately arranged in the first direction, wherein the pixel electrode in a first pixel electrode column is confined in an area defined by two adjacent scanning lines and two adjacent data lines, and the pixel electrode in a second pixel electrode column is confined in an area defined by two adjacent data lines and, meanwhile, the pixel electrode in a second pixel electrode column overlaps with a scanning line.

18. The driving method according to claim 11, wherein:
the plurality of pixel groups are arranged in an array, and the pixel region is not disposed between two adjacent pixel groups.

19. The driving method according to claim 11, wherein:
the plurality of pixel groups and the plurality of pixel regions are alternately arranged, and at least one of the plurality of pixel regions is disposed between two adjacent pixel groups.

20. The driving method according to claim 11, wherein:
one pixel only includes one pixel electrode.

* * * * *